(12) United States Patent
Bovyrin (10) Patent No.: US 7,149,354 B2
(45) Date of Patent: Dec. 12, 2006

(54) EXTRACTION OF A SCENE STRUCTURE BASED ON GRADIENT RUNS ANALYSIS

(75) Inventor: Alexander V. Bovyrin, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 663 days.

(21) Appl. No.: 10/317,318

(22) Filed: Dec. 12, 2002

(65) Prior Publication Data

US 2004/0114805 A1    Jun. 17, 2004

(51) Int. Cl.
*G06K 9/48* (2006.01)
(52) U.S. Cl. .................................................. 382/199
(58) Field of Classification Search ......... 382/199–200
See application file for complete search history.

(56) References Cited

U.S. PATENT DOCUMENTS

| 4,656,507 | A | * | 4/1987 | Greaves et al. | 348/26 |
|---|---|---|---|---|---|
| 4,817,174 | A | * | 3/1989 | Nakatani | 382/266 |
| 4,995,087 | A | * | 2/1991 | Rathi et al. | 382/152 |
| 5,532,843 | A | * | 7/1996 | Otsuki | 358/453 |
| 6,392,759 | B1 | * | 5/2002 | Kuwata et al. | 358/1.9 |
| 6,628,833 | B1 | * | 9/2003 | Horie | 382/173 |
| 7,003,160 | B1 | * | 2/2006 | Horie | 382/199 |

OTHER PUBLICATIONS

G. A. Baxes, Digital Image Processing: Principles and Applications. New York: Wiley, 1994. pp. 93-98, 134-135.*

* cited by examiner

*Primary Examiner*—Joseph Mancuso
*Assistant Examiner*—Hadi Akhavannik
(74) *Attorney, Agent, or Firm*—Sanjay S. Gadkari (57) ABSTRACT

A method of extracting a scene structure includes determining a plurality of image edges in an image, based on image gradients. A redundant edge is eliminated from the plurality of image edges. The plurality of image edges is linked into a planar graph. A broken edge is restored by a forced extension.

29 Claims, 11 Drawing Sheets

EXTRACTION OF A SCENE STRUCTURE BASED ON GRADIENT RUNS ANALYSIS

BACKGROUND

1. Technical Field

An embodiment of the present invention generally relates to detecting edges of an image. More particularly, an embodiment of the present invention relates to extracting a scene structure using a gradient runs analysis.

2. Discussion of the Related Art

The concept of coding digital images with runs dates back to the beginning of computer vision. A digital image may comprise sequences of equal intensity pixels adjacent in a row/column, and the edges of objects in the image must somehow be detected in order to properly reproduce the image electronically. For example, a binary runs representation of a binary image, wherein the relationship between binary runs is analyzed, is often used for image compression, enumeration and extraction of connected components, and for generating image structural descriptions using graphs. Building contours of connected components based on a binary runs analysis may enable multilevel image analysis in real-time.

On the other hand, an edge-detecting algorithm may use image gradients to determine the edges of an object within an image. For purposes of illustration, the notion of a binary run in an image may be generalized as a group of adjacent pixels having the same properties. For example, segments of a piecewise-linear approximation of a row/column of a grayscale image are known as a gradient run. According to this technique, steep gradient runs characterize object borders in an image. Consequently, the object borders may be tracked by using the relation of gradient runs in adjacent rows/columns.

In order to track all the edges in an image, it is necessary to be able to combine the row runs information and the column runs information. While the relationship between binary runs may be used to track the borders of an object within a binary image, the complexity of an edge-detecting algorithm required to incorporate the relationship between gradient runs relating to a gray scale image has thus far prevented the development of such an algorithm.

Furthermore, some edge detection techniques require that a neighborhood of pixels be explored in order to obtain image edges. This technique substantially burdens the cache in a processor, for example.

DETAILED DESCRIPTION

Reference in the specification to "one embodiment", "an embodiment", or "another embodiment" of the present invention means that a particular feature, structure or characteristic described in connection with the embodiment is included in at least one embodiment of the present invention. Thus, appearances of the phrase "in one embodiment" or "according to an embodiment" appearing in various places throughout the specification are not necessarily all referring to the same embodiment. Likewise, appearances of the phrase "in another embodiment" or "according to another embodiment" appearing in various places throughout the specification are not necessarily referring to different embodiments.

The method of extracting a scene structure may speed up and facilitate image analysis. Within the method, memory may be accessed sequentially during edge extraction, thereby utilizing cache more efficiently than some other techniques. Within the method, features (e.g., straight edges, regions, and junctions) of the image may be conveniently obtained by utilizing a planar graph. The method may be highly adaptive to ambiguities. For example, the method may be robust to noise and illumination variations. According to an embodiment of the method, a gradient runs construction, a gradient runs analysis, and a generation of a planar graph may be processed more quickly because different parts of the image may be processed independently.

Figure 1:
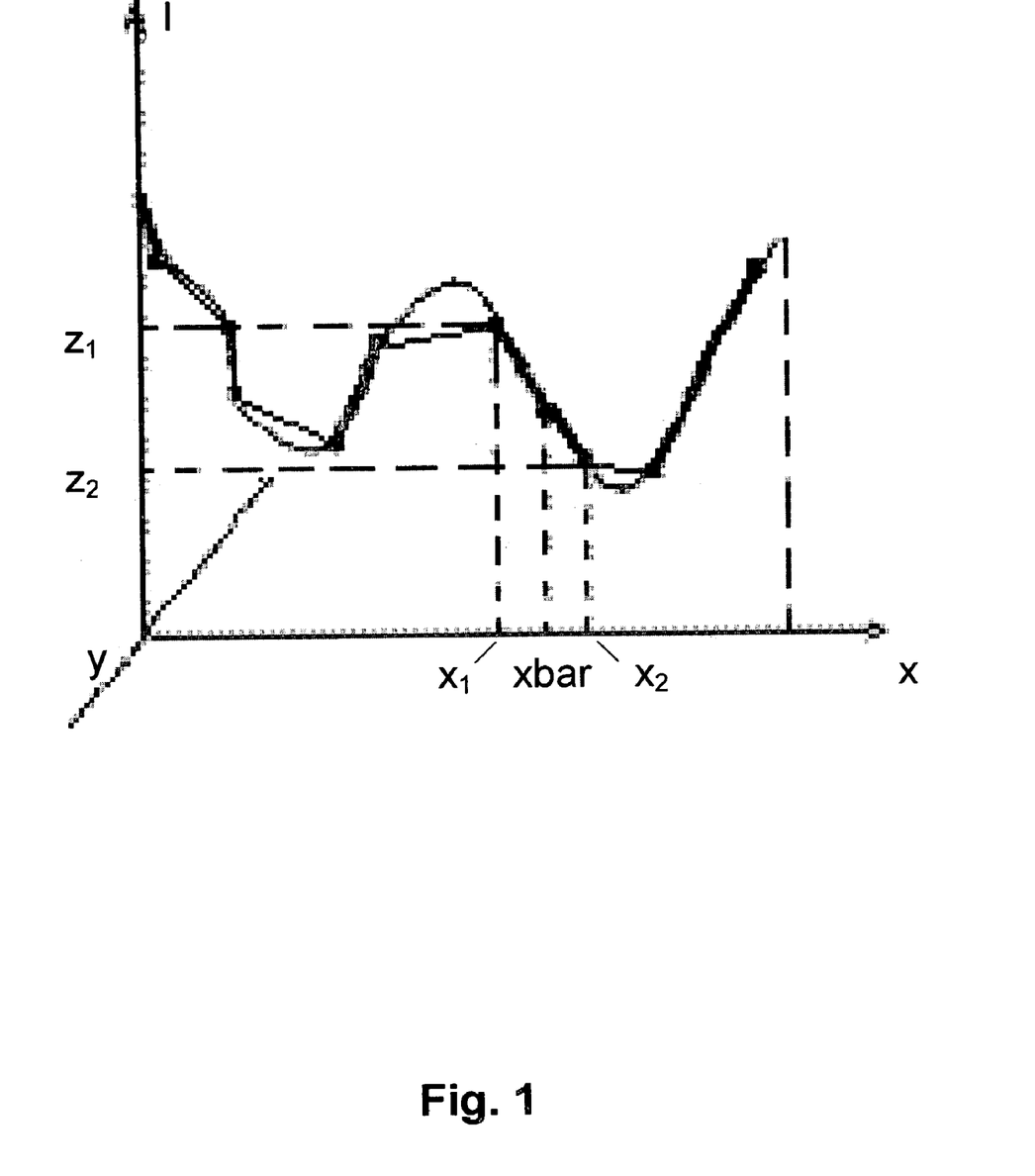
FIG. 1 illustrates a 3-dimensional plot representing the construction of gradient runs of an image according to an embodiment of the present invention.

FIG. 1 illustrates a 3-dimensional plot representing the construction of gradient runs of an image according to an embodiment of the present invention. For example, a point of an image edge may be defined by the special point, xbar, on the line extending between points $x_1$ and $x_2$.

Figure 2:
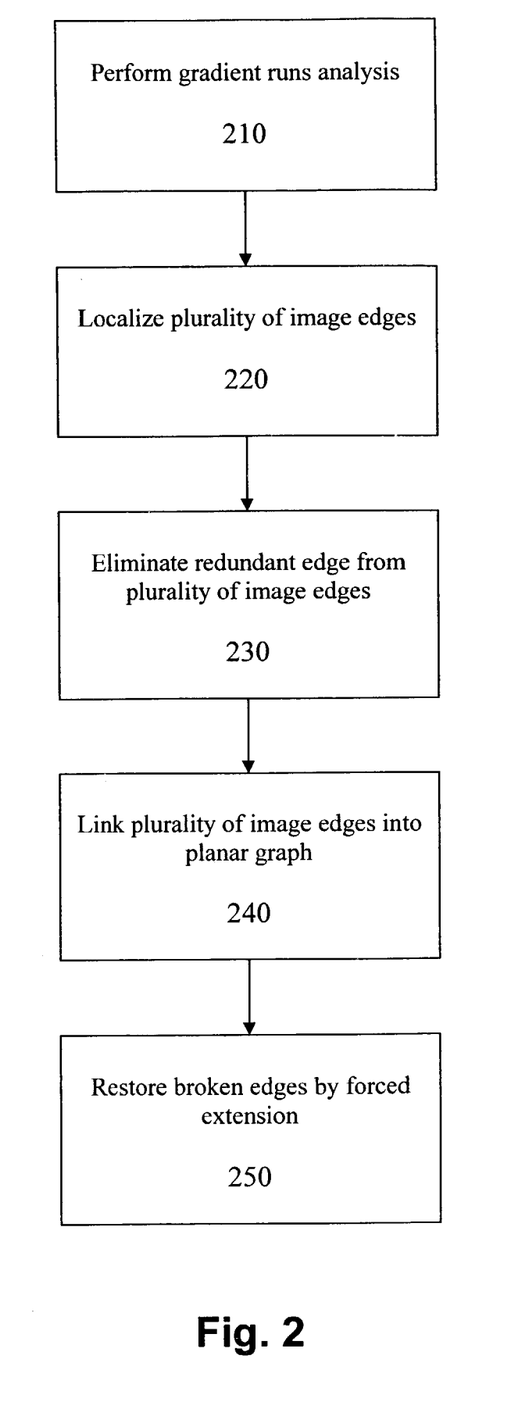
FIG. 2 illustrates a flow chart for a method of extracting a scene structure according to an embodiment of the present invention.

FIG. 2 illustrates a flow chart for a method of extracting a scene structure according to an embodiment of the present invention. Within the method, a gradient runs analysis may be performed 210. For example, a plurality of image rows and image columns may be read. The image rows and image columns may be converted into a plurality of row gradient runs and column gradient runs, respectively.

Gradient runs may be used to represent an image, for example, by considering a scalar function $z=f(x,y)$. The meaning of the function may depend upon the specific situation for which gradient runs are to be employed. For instance, the function may represent intensity in grayscale or a single channel in a multi-channel image. A horizontal gradient run may be defined by the equation $<x_1,x_2,y,z_1,z_2>=HR_y$, where $x_1$ is the coordinate of the beginning of the run, $x_2$ is the coordinate of the end of the run, y is the index of the image row, $z_1 = f(x_1,y)$, and $z_2 = f(x_2,y)$. A vertical gradient run may be defined by the equation $<y_1,y_2,x,z_1,z_2> = VR_x$, where $y_1$ is the coordinate of the beginning of the run, $y_2$ is the coordinate of the end of the run, x is the index of the image column, $z_1 = f(x,y_1)$, and $z_2 = f(x,y_2)$.

In an embodiment of the present invention, it may be assumed, for purposes of illustration, that the area below $f$ is the intensity in grayscale. The construction of gradient runs may be reduced to a problem of piecewise-linear approximation of the function $f$. The type of approximation method to be employed is dependent upon prior information concerning the image to be manipulated. For example, if a number of edges that cross the row/column is known, then an optimization problem may be encountered. If a noise level is known, then an approximation method based on the maximum deviation of pixel values from the approximating segment may be employed. For instance, a Douglas-Peucker approximation may be employed.

In an embodiment, only image rows are considered. For example, a run $[x_1,x_2]$ of pixels that satisfies the following conditions may be chosen for each row:

$$\forall x \in [x_1, x_2], (I'(x) > T_1 \ \& \ \bar{I}d(x) > T_2) \text{ or } (I'(x) < -T_1 \ \& \ \bar{I}d(x) < -T_2), \text{ where } I'(x) = f_x'(x,y),$$

$$\bar{I}d(x) = \left( \sum_{l=x-d}^{x+d} I(i) \right) / (2d+1),$$

and $\bar{I}d(x)$ is the mean value of the intensity. The condition $T_1 \geq 0$ depends on the image contrast, and the conditions $T_2, d \geq 0$ depend on the noise.

Referring to FIG. 1, a point, $xbar^{(R)}$, may be calculated to define a point of the image edge for each gradient run, R. For example, $xbar^{(R)}$ may represent the mean of the run, R. For illustrative purposes, $xbar^{(R)}$ may be defined by the following equation:

$$xbar^{(R)} = \operatorname{argmin}(|I(x) - z_2| - |I(x) - z_1|).$$

For example, a runs construction based on the preceding algorithm may take 10–15 ms (non-optimized code) for an image with 320×240 pixel resolution on a personal computer having a Pentium® III 700 MHz processor.

Referring again to FIG. 2, a plurality of image edges may be localized 220. For example, row gradient runs may be analyzed to obtain at least one vertical edge, and column gradient runs may be analyzed to obtain at least one horizontal edge. The plurality of image edges may include a vertical edge and a horizontal edge.

According to an embodiment of the present invention, localization of the image edges may involve edge detection, which is generally based on a smoothing and differentiation of the image. The first derivatives $f_x', f_y'$ of the image at point (x,y) may be estimated by utilizing coefficients, $k_R$, which indicate the pitch of the gradient runs that include point (x,y). If R is a horizontal run, then $k_R$ may be represented by the following equation:

$$k_R = (z_2 - z_1)/(x_2 - x_1).$$

If R is a vertical run, then $k_R$ may be represented by the following equation:

$$k_R = (z_2 - z_1)/(y_2 - y_1).$$

Depending on the image contrast, Kbar>0 may be chosen such that runs having $|k_R| < $Kbar may be considered to represent uniform regions in the image, and runs having $|k_R| \geq $Kbar may be considered to represent peculiar image domains.

For purposes of illustration, gradient runs generally may be classified into two categories: (1) growing and (2) falling. In growing gradient runs, $z_2 - z_1 > 0$. In falling gradient runs, $z_2 - z_1 < 0$. To simplify the discussion, only horizontal runs will be considered, though the discussion is generally the same for vertical runs. For example, two gradient runs, $R_1$ and $R_2$, may be connected if they lie in adjacent rows and the following condition is satisfied:

$$(x_2^{(R1)} \geq x_1^{(R2)}) \ \& \ (x_2^{(R2)} \geq x_1^{(R1)}).$$

In an embodiment, two runs, $R_1$ and $R_2$, of the same type (e.g., both horizontal runs or both vertical runs) may be edge-forming if the following conditions are satisfied:
(1) $R_1$ and $R_2$ are connected;
(2) $|k_{R1}| \geq $Kbar and $|k_{R2}| \geq $Kbar;
(3) $(xbar^{(R1)} - xbar^{(R2)}) \leq D_1$ (for edge smoothness); and
(4) $\min(|z_1^{(R2)} - z_1^{(R1)}|, |z_2^{(R2)} - z_2^{(R1)}|) \leq D_2$ (for noise reduction);

where parameters $D_1$, $D_2$ may be chosen based on an image noise level.

According to an embodiment, all edge-forming runs may be detected during a single pass. The line that connects the points, $xbar^{(R)}$, of the edge-forming runs may approximate a border between uniform regions. An edge in an image may be represented as a polyline that connects the points, $xbar^{(R)}$, of the edge-forming runs.

Figure 3:
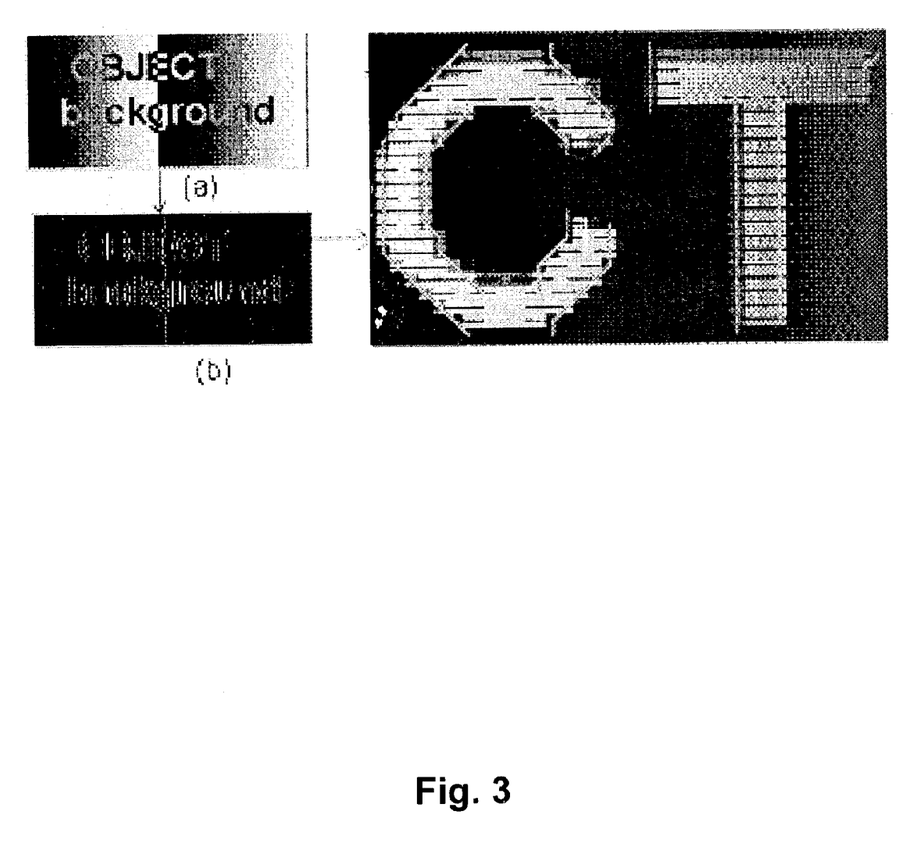
FIG. 3 illustrates construction of vertical image edges according to an embodiment of the present invention.

For example, FIG. 3 illustrates construction of vertical image edges according to an embodiment of the present invention. FIG. 3a shows the source image. FIG. 3b shows the vertical image edges that may be generated by linking horizontal runs.

Figure 4:
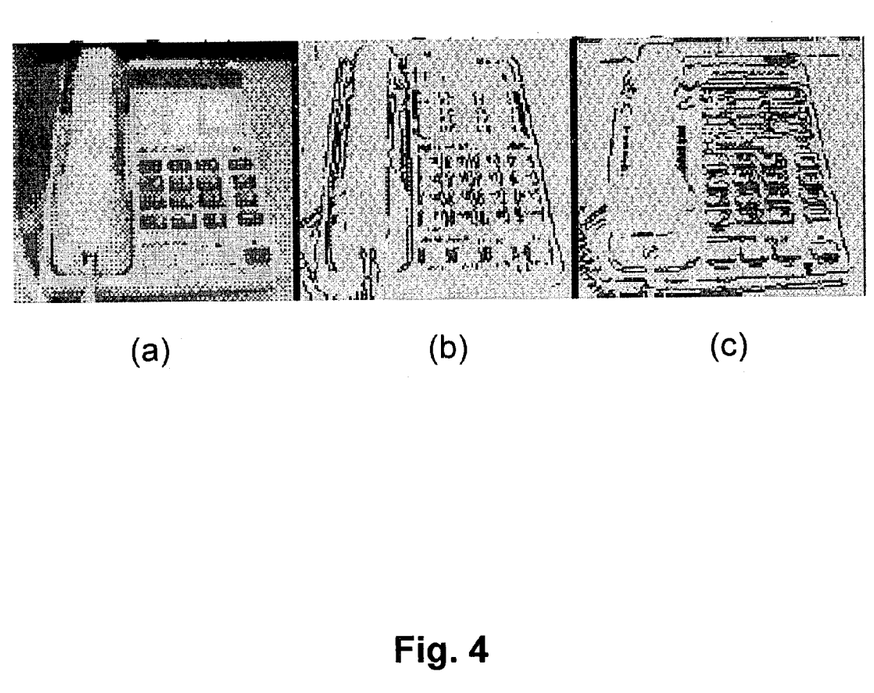
FIG. 4 illustrates an example of edge extraction according to an embodiment of the present invention.

FIG. 4 illustrates an example of edge extraction according to an embodiment of the present invention. In this example, $f(x,y)$ represents intensity. The gradient runs have been derived by the method described above with $T_1$=Kbar=5, d=1, $T_2$=0, $D_1$=2, and $D_2$=50. FIG. 4a shows the source grayscale image. FIG. 4b shows the edges generated by performing horizontal gradient runs. FIG. 4c shows the edges generated by performing vertical gradient runs.

Returning to FIG. 2, a redundant edge may be eliminated 230 from the plurality of image edges. The plurality of image edges may be linked 240 into a planar graph. The planar graph may be constructed by joining edges that may be obtained by linking the points, $xbar^{(R)}$, of vertical and horizontal runs. A horizontal run, $HR_y$, and a vertical run, $VR_x$, are crossed if they each contain point (x,y), for example. According to an embodiment, inclined edges in an image (e.g., where $|f_x'| \geq $Kbar and $|f_y'| \geq $Kbar) may be represented by horizontal runs, as well as by vertical runs.

Figure 5:
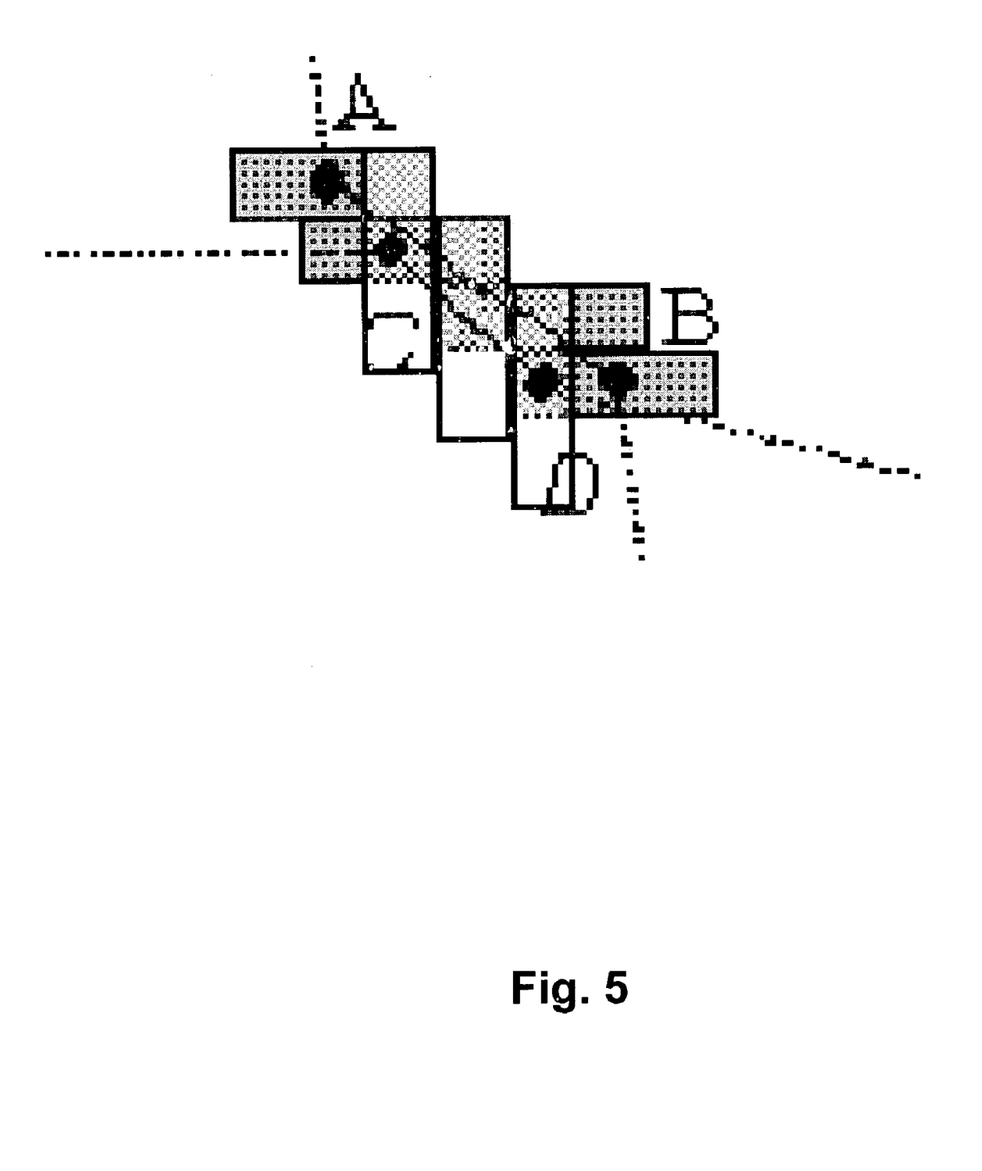
FIG. 5 illustrates a polyline generated from horizontal runs representing the same edge of an image as a polyline generated from vertical runs according to an embodiment of the present invention.

FIG. 5 illustrates a polyline generated from horizontal runs representing the same edge of an image as a polyline generated from vertical runs according to an embodiment of the present invention. A segment of a first polyline may be represented as AB. A segment of a second polyline may be represented as CD. If the first polyline is based on a horizontal run and the second polyline is based on a vertical run, the segments may represent a single image edge if, for example, the runs that produce points A and C and the runs that produce points B and D cross each other and lie in the same neighborhood.

In an embodiment, intervals of polylines obtained from vertical runs that represent a single image edge may be eliminated. A graph may be obtained that has vertices corresponding to the points, xbar$^{(R)}$, of linked runs. The degree of the vertices may not be greater than two.

Figure 6:
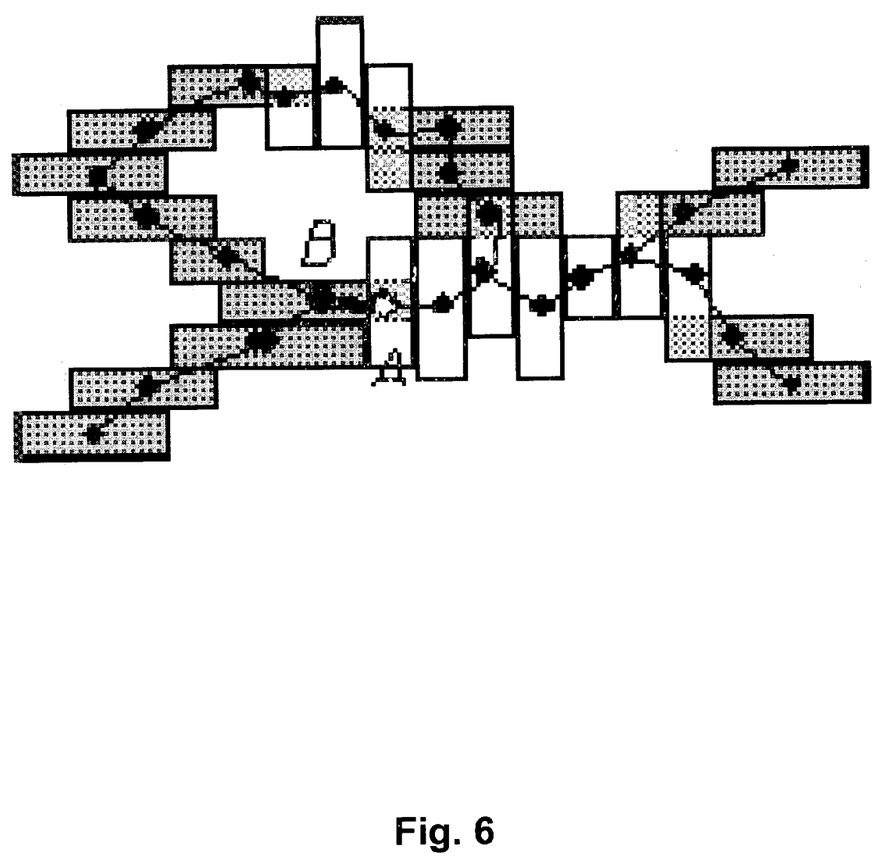
FIG. 6 illustrates an end-point, A, of a polyline generated from vertical runs linked with the nearest point, B, of a polyline generated from horizontal runs according to an embodiment of the present invention.

FIG. 6 illustrates an end-point, A, of a polyline generated from vertical runs linked with the nearest point, B, of a polyline generated from horizontal runs according to an embodiment of the present invention. For example, a run that produces a first vertex with degree one (e.g., an endpoint of a polyline) may indicate a crossed run. A crossed run that contains a second vertex, wherein the second vertex is the vertex nearest the first vertex, may be used to determine an image edge. The image edge may be added to a graph, for example, if segment $[z_1^{(R1)}-z_2^{(R1)}]$ and segment $[z_1^{(R2)}-z_2^{(R2)}]$ are crossed. In an embodiment, graph cycles that do not contain subcycles may not correspond to uniform image regions.

In an image, the color of a region may be estimated, for example, by the intensity of runs endpoints that lie inside the region. In an embodiment, region environs may be estimated by the intensity of runs endpoints that lie outside the region.

Referring to FIG. 2, a broken edge may be restored 250 by a forced extension. Region borders may be broken, for example, if an image has a low contrast. In an embodiment, a region may be closed via edge extension to obtain a structural scene description of a higher quality.

Figure 7:
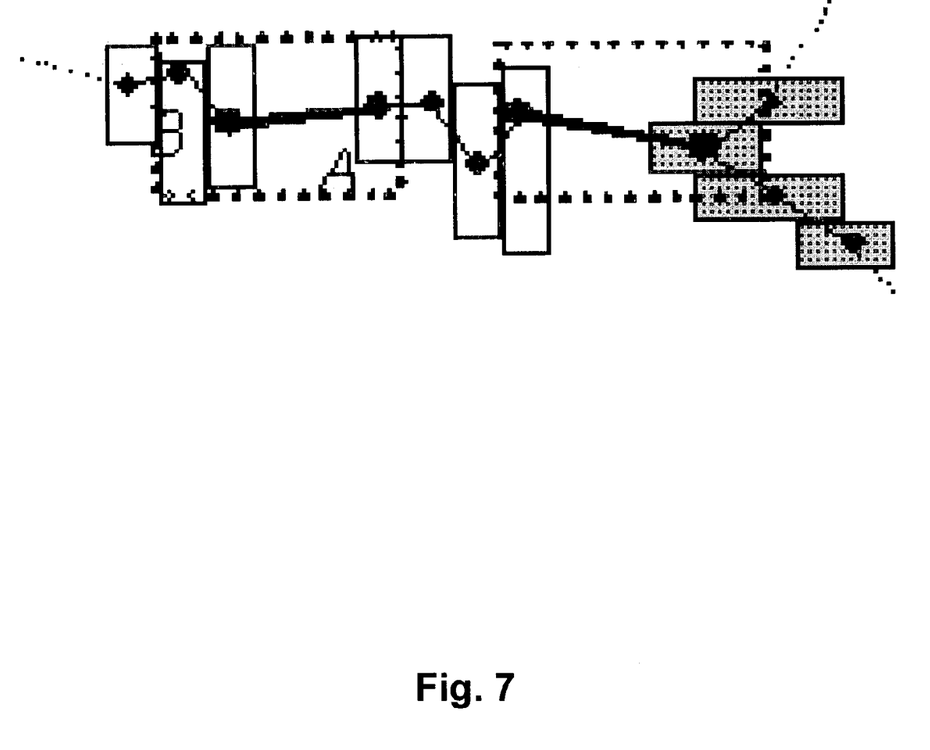
FIG. 7 illustrates an end-point, A, of an edge generated from vertical runs linked with the nearest graph vertex, B, that lies in some rectangle according to an embodiment of the present invention.

FIG. 7 illustrates an end-point, A, of an edge generated from vertical runs linked with the nearest graph vertex, B, that lies in some rectangle according to an embodiment of the present invention. For example, each graph vertex having a degree equal to one may be linked with the closest vertex in the neighborhood that includes the graph vertex. The neighborhood may be chosen according to the orientation of edges that correspond to the vertices to be linked. For example, if a vertex is at a left end of an edge that is formed by horizontal runs, then a rectangle to the left of the vertex, having sides parallel to the image axes, may be chosen as the neighborhood.

Returning to FIG. 2, the forced extension may involve linking a first vertex of a neighborhood and a second vertex of the neighborhood. The neighborhood may be chosen based on an orientation of edges that correspond to the first and second vertices.

Figure 8:
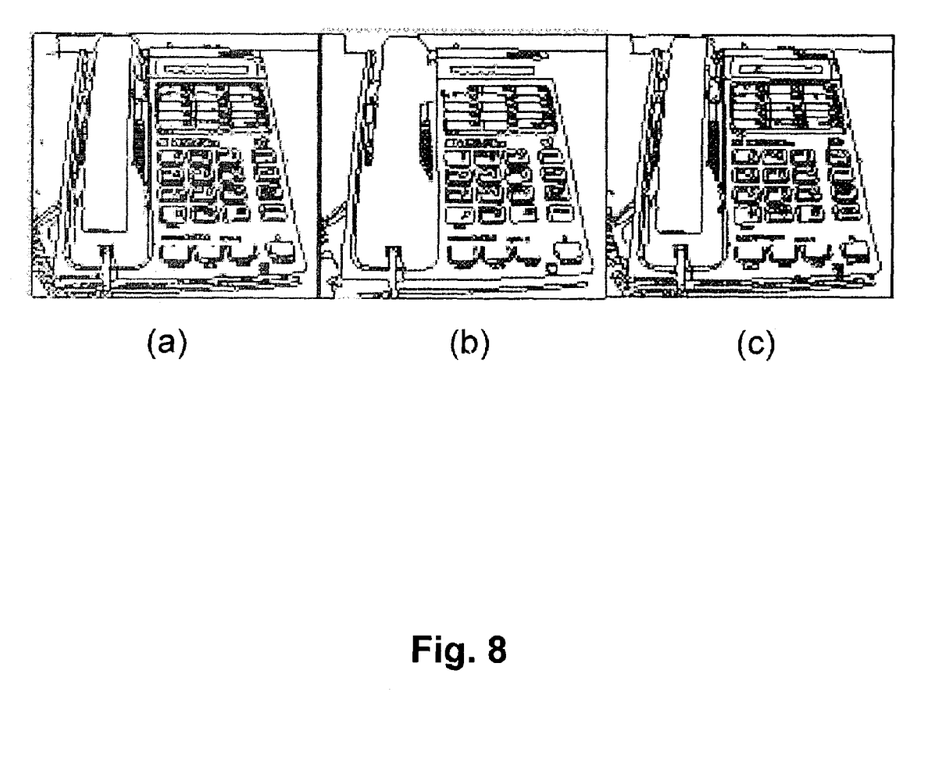
FIG. 8 illustrates a pictorial representation of the result of edge extension according to an embodiment of the present invention.

FIG. 8 illustrates a pictorial representation of edge extension according to an embodiment of the present invention. FIG. 8a shows an edge graph of the telephone of FIG. 4a. FIG. 8b shows graph cycles of the telephone, which include broken borders. FIG. 8c shows the graph cycles after the broken borders have been closed via edge extension.

Figure 9:
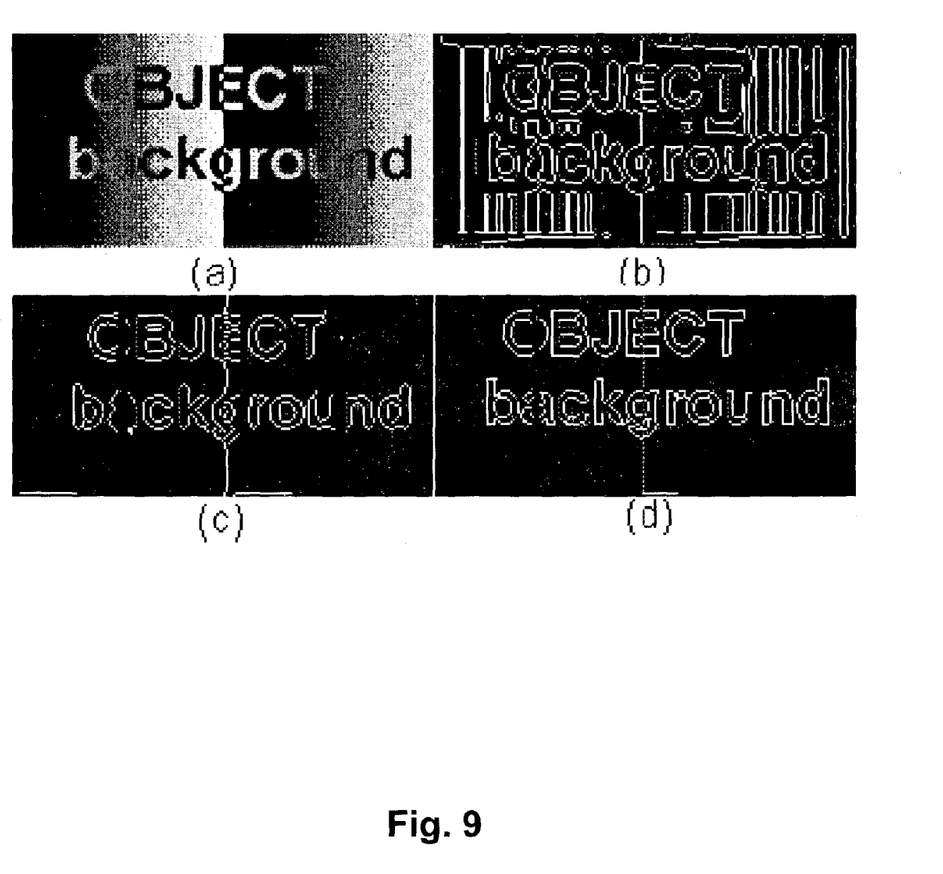
FIG. 9 illustrates a pictorial representation of edge extension resulting from a variety of edge detectors, one of which incorporates an algorithm according to an embodiment of the present invention.

FIG. 9 illustrates a pictorial representation of edge extension resulting from a variety of edge detectors, one of which incorporates an algorithm according to an embodiment of the present invention. FIG. 9a shows the source image. FIG. 9b shows edge extension resulting from a zero-crossing algorithm. FIG. 9c shows edge extension resulting from a Canny algorithm. FIG. 9d shows edge extension resulting from an algorithm according to an embodiment of the present invention.

Figure 10:
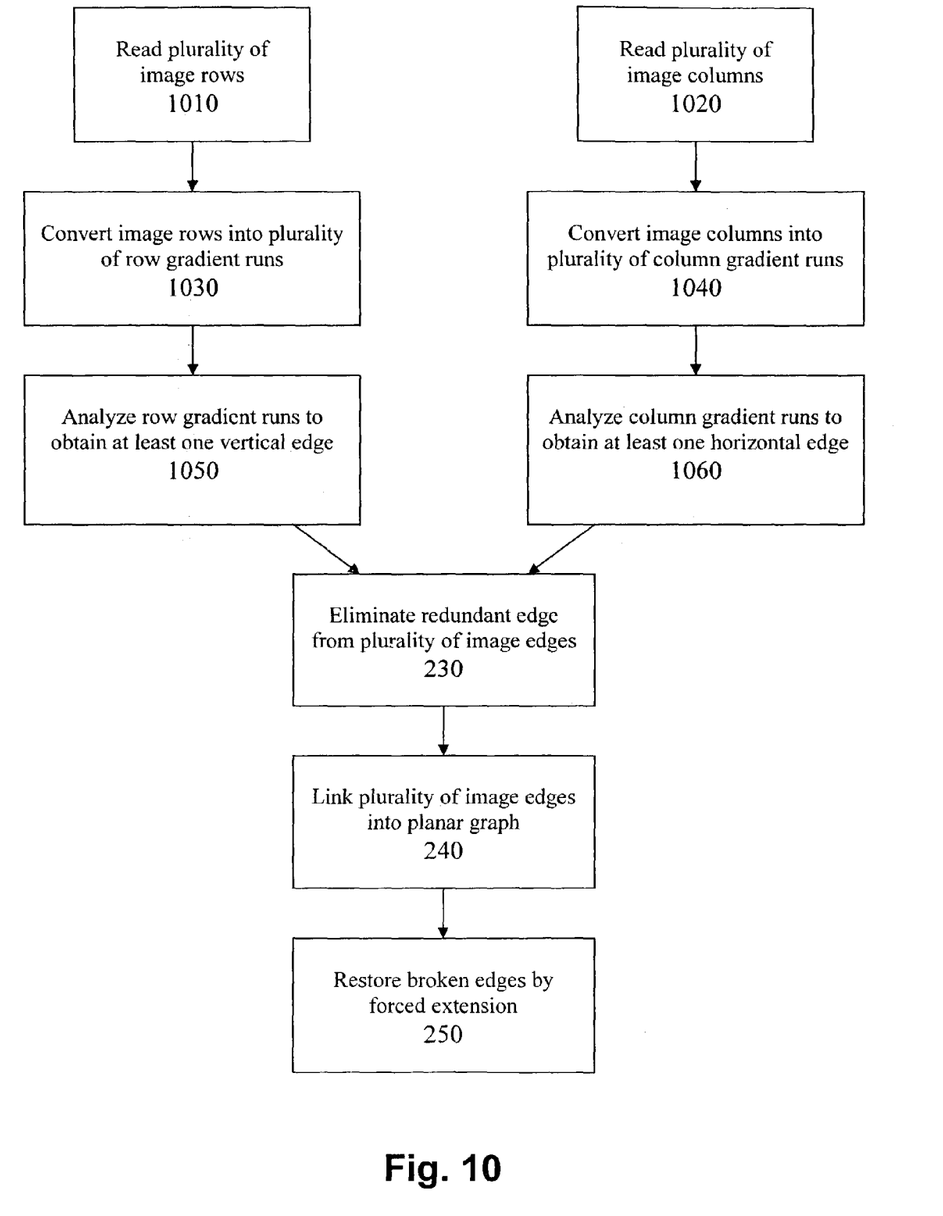
FIG. 10 illustrates a flow chart for a method of extracting a scene structure according to an embodiment of the present invention.

FIG. 10 illustrates a flow chart for a method of extracting a scene structure according to an embodiment of the present invention. Within the method, a plurality of image rows may be read 1010. A plurality of image columns may be read 1020. The image rows may be converted 1030 into a plurality of row gradient runs. The image columns may be converted 1040 into a plurality of column gradient runs. The row gradient runs may be analyzed 1050 to obtain at least one vertical edge. The column gradient runs may be analyzed 1060 to obtain at least one horizontal edge.

According to an embodiment of the present invention, the method may further include eliminating 230 a redundant edge from a plurality of image edges. In an embodiment, the method may further include linking 240 a plurality of image edges into a planar graph. A broken edge may be restored 250 by a forced extension.

Figure 11:
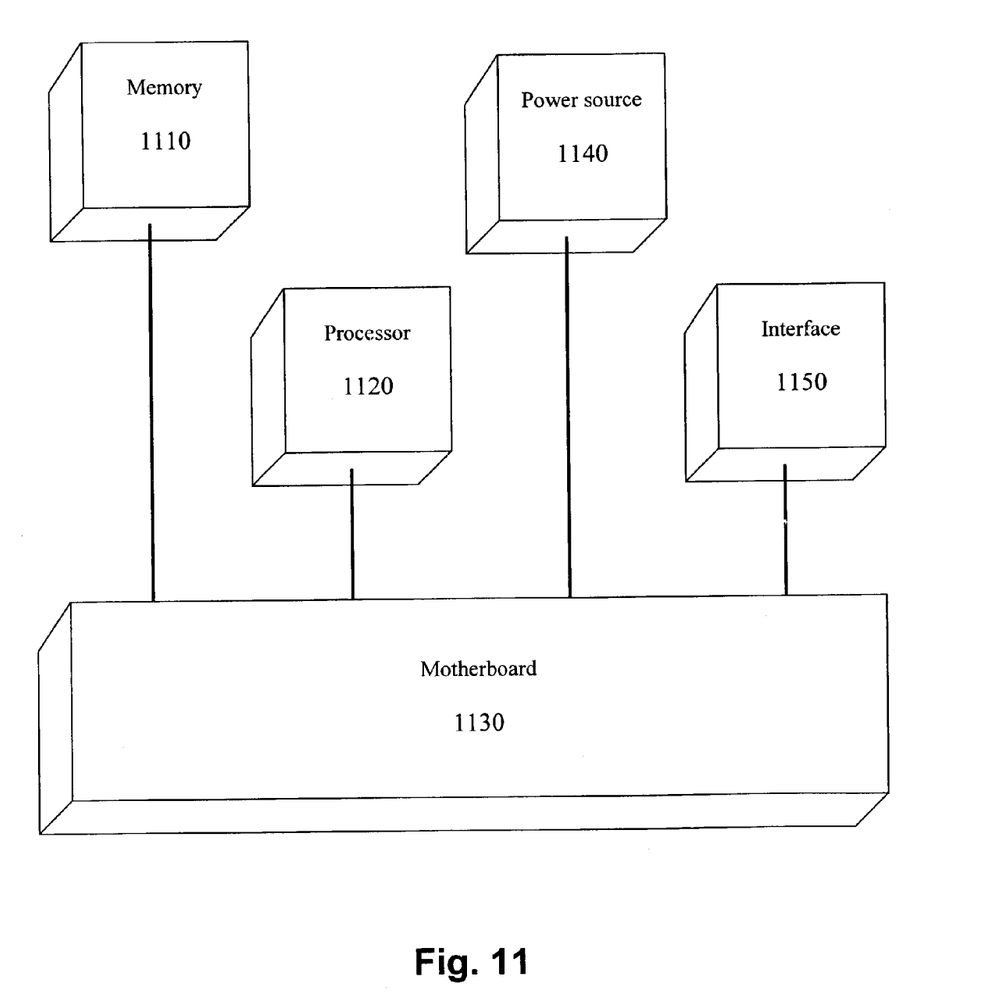
FIG. 11 illustrates a data processing device according to an embodiment of the present invention.

FIG. 11 illustrates a data processing device according to an embodiment of the present invention. The data processing device 1100 may include a memory 1110, at least one processor 1120, a motherboard 1130, a power source 1140, and an interface 1150. The memory 1110 may receive information based on an image. The processor 1120 may perform a gradient runs analysis. The information may be converted into a plurality of gradient runs. At least one image edge, based on a relationship between the plurality of gradient runs, may be obtained.

According to an embodiment of the present invention, the processor 1120 may eliminate a redundant edge. In an embodiment, the processor 1120 may restore a broken edge.

While the description above refers to particular embodiments of the present invention, it will be understood that many modifications may be made without departing from the spirit thereof. The accompanying claims are intended to cover such modifications as would fall within the true scope and spirit of an embodiment of the present invention. The presently disclosed embodiments are therefore to be considered in all respects as illustrative and not restrictive, the scope of an embodiment of the invention being indicated by the appended claims, rather than the foregoing description, and all changes that come within the meaning and range of equivalency of the claims are therefore intended to be embraced therein.

What is claimed is:

1. A method comprising:
reading a plurality of image rows;
reading a plurality of image columns;
converting the image rows into a plurality of row gradient runs, a row gradient run being defined by the equation <x1, x2, y, z1, z2>=HRy, where x1 is the coordinate of the beginning of the run, x2 is the coordinate of the end of the run, y is the index of an image row, z1=$f$ (x1, y), and z2=$f$ (x2, y) for some scalar function $f$;
converting the image columns into a plurality of column gradient runs, a column gradient run being defined by the equation <y1, y2, x, z1, z2>=VRx, where y1 is the coordinate of the beginning of the run, y2 is the coordinate of the end of the run, x is the index of an image column, z1=$f$(x, y1), and z2=$f$ (x, y2) for some scalar function $f$;
analyzing the row gradient runs to obtain at least one vertical edge;
analyzing the column gradient runs to obtain at least one horizontal edge; and
restoring a broken edge by a forced extension.

2. The method of claim 1, wherein converting the image rows and image columns and analyzing the row gradient runs and column gradient runs involve sequentially accessing a memory.

3. The method of claim 1, wherein the forced extension involves linking a first vertex of a neighborhood and a second vertex of the neighborhood, wherein the neighborhood is chosen based on an orientation of edges that correspond to the first vertex and the second vertex.

4. The method of claim 1, further including eliminating a redundant edge from a plurality of image edges.

5. The method of claim 1, further including linking a plurality of image edges into a planar graph.

6. A method comprising:
   determining a plurality of image edges in an image, based on image gradients by converting the image rows into a plurality of row gradient runs, a row gradient run being defined by the equation $<x1, x2, y, z1, z2> = HRy$, where x1 is the coordinate of the beginning of the run, x2 is the coordinate of the end of the run, y is the index of an image row, $z1=f(x1, y)$, and $z2=f(x2, y)$ for some scalar function $f$;
   converting the image columns into a plurality of column gradient runs, a column gradient run being defined by the equation $<y1, y2, x, z1, z2> = VRx$, where y1 is the coordinate of the beginning of the run, y2 is the coordinate of the end of the run, x is the index of an image column, $z1=f(x, y1)$, and $z2=f(x, y2)$ for some scalar function $f$
   eliminating a redundant edge from the plurality of image edges;
   linking the plurality of image edges into a planar graph; and
   restoring a broken edge by a forced extension.

7. The method of claim 6, wherein determining the plurality of image edges involves sequentially accessing a memory.

8. The method of claim 6, wherein the forced extension involves linking a first vertex of a neighborhood and a second vertex of the neighborhood, wherein the neighborhood is chosen based on an orientation of edges that correspond to the first vertex and the second vertex.

9. The method of claim 6, further including performing a gradient runs analysis.

10. The method of claim 6, further including localizing a vertical image edge and a horizontal image edge.

11. A method comprising:
    performing a gradient runs analysis using one or more of row gradient runs and column gradient runs to perform the analysis, where a row gradient run is defined by the equation $<x1, x2, y, z1, z2> = HRy$, where x1 is the coordinate of the beginning of the run, x2 is the coordinate of the end of the run, y is the index of an image row, $z1=f(x1, y)$, and $z2=f(x2, y)$ for some scalar function $f$ and a column gradient run is defined by the equation $<y1, y2, x, z1, z2> = VRx$, where y1 is the coordinate of the beginning of the run, y2 is the coordinate of the end of the run, x is the index of an image column, $z1=f(x, y1)$, and $z2=f(x, y2)$ for some scalar function $f$
    localizing a plurality of image edges, wherein the plurality of image edges includes a vertical image edge and a horizontal image edge;
    eliminating a redundant edge from the plurality of image edges;
    linking the plurality of image edges into a planar graph; and
    restoring a broken edge by a forced extension.

12. The method of claim 11, wherein performing the gradient runs analysis and localizing the plurality of image edges involve sequentially accessing a memory.

13. The method of claim 11, wherein the forced extension involves linking a first vertex of a neighborhood and a second vertex of the neighborhood, wherein the neighborhood is chosen based on an orientation of edges that correspond to the first vertex and the second vertex.

14. An article comprising:
    a storage medium having stored thereon instructions that when executed by a machine result in the following:
    reading a plurality of image rows,
    reading a plurality of image columns,
    converting the image rows into a plurality of row gradient runs, a row gradient run being defined by the equation $<x1, x2, y, z1, z2> = HRy$, where x1 is the coordinate of the beginning of the run, x2 is the coordinate of the end of the run, y is the index of an image row, $z1=f(x1, y)$, and $z2=f(x2, y)$ for some scalar function $f$;
    converting the image columns into a plurality of column gradient runs, a column gradient run being defined by the equation $<y1, y2, x, z1, z2> = VRx$, where y1 is the coordinate of the beginning of the run, y2 is the coordinate of the end of the run, x is the index of an image column, $z1=f(x, y1)$, and $z2=f(x, y2)$ for some scalar function $f$;
    analyzing the row gradient runs to obtain at least one vertical edge,
    analyzing the column gradient runs to obtain at least one horizontal edge, and
    restoring a broken edge by a forced extension.

15. The article of claim 14, wherein converting the image rows and image columns and analyzing the row gradient runs and column gradient runs involve sequentially accessing a memory.

16. The article of claim 14, wherein the forced extension involves linking a first vertex of a neighborhood and a second vertex of the neighborhood, wherein the neighborhood is chosen based on an orientation of edges that correspond to the first vertex and the second vertex.

17. The article of claim 14, wherein the instructions further result in eliminating a redundant edge from a plurality of image edges.

18. The article of claim 14, wherein the instructions further result in linking a plurality of image edges into a planar graph.

19. An article comprising:
    a storage medium having stored thereon instructions that when executed by a machine result in the following:
    determining a plurality of image edges in an image, based on image gradients, by converting the image rows into a plurality of row gradient runs, a row gradient run being defined by the equation $<x1, x2, y, z1, z2> = HRy$, where x1 is the coordinate of the beginning of the run, x2 is the coordinate of the end of the run, y is the index of an image row, $z1=f(x1, y)$, and $z2=f(x2, y)$ for some scalar function $f$; converting the image columns into a plurality of column gradient runs, a column gradient run being defined by the equation $<y1, y2, x, z1, z2> = VRx$, where y1 is the coordinate of the beginning of the run, y2 is the coordinate of the end of the run, x is the index of an image column, $z1=f(x, y1)$, and $z2=f(x, y2)$ for some scalar function $f$;
    eliminating a redundant edge from the plurality of image edges,
    linking the plurality of image edges into a planar graph, and
    restoring a broken edge by a forced extension.

20. The article of claim 19, wherein determining the plurality of image edges involves sequentially accessing a memory.

21. The article of claim 19, wherein the forced extension involves linking a first vertex of a neighborhood and a second vertex of the neighborhood, wherein the neighborhood is chosen based on an orientation of edges that correspond to the first vertex and the second vertex.

22. The article of claim 19, wherein the instructions further result in performing a gradient runs analysis.

23. The article of claim 19, wherein the instructions further result in localizing a vertical image edge and a horizontal image edge.

24. An article comprising:
a storage medium having stored thereon instructions that when executed by a machine result in the following:
performing a gradient runs analysis, using one or more of row gradient runs and column gradient runs to perform the analysis, where a row gradient run is defined by the equation <x1, x2, y, z1, z2>=HRy, where x1 is the coordinate of the beginning of the run, x2 is the coordinate of the end of the run, y is the index of an image row, $z1=f(x1, y)$, and $z2=f(x2, y)$ for some scalar function $f$ and a column gradient run is defined by the equation <y1, y2, x, z1, z2>=VRx, where y1 is the coordinate of the beginning of the run, y2 is the coordinate of the end of the run, x is the index of an image column, $z1=f(x, y1)$, and $z2=f(x, y2)$ for some scalar function $f$;
localizing a plurality of image edges, wherein the plurality of image edges includes a vertical image edge and a horizontal image edge,
eliminating a redundant edge from the plurality of image edges,
linking the plurality of image edges into a planar graph, and
restoring a broken edge by a forced extension.

25. The article of claim 24, wherein performing the gradient runs analysis and localizing the plurality of image edges involve sequentially accessing a memory.

26. The article of claim 24, wherein the forced extension involves linking a first vertex of a neighborhood and a second vertex of the neighborhood, wherein the neighborhood is chosen based on an orientation of edges that correspond to the first vertex and the second vertex.

27. A data processing device, comprising:
a memory to receive information based on an image;
at least one processor to perform a gradient runs analysis, wherein the information is converted into a plurality of gradient runs, by converting the image rows into a plurality of row gradient runs, a row gradient run being defined by the equation <x1, x2, y, z1, z2>=HRy, where x1 is the coordinate of the beginning of the run, x2 is the coordinate of the end of the run, y is the index of an image row, $z1=f(x1, y)$, and $z2=f(x2, y)$ for some scalar function $f$;
and by converting the image columns into a plurality of column gradient runs, a column gradient run being defined by the equation <y1, y2, x, z1, z2>=VRx, where y1 is the coordinate of the beginning of the run, y2 is the coordinate of the end of the run, x is the index of an image column, $z1=f(x, y1)$, and $z2=f(x, y2)$ for some scalar function $f$;
and at least one image edge based on a relationship between the plurality of gradient runs is obtained;
a motherboard electrically coupled to the memory and to the at least one processor;
a power source to provide power to the motherboard; and
an interface to provide a planar graph, wherein the planar graph includes a representation of the at least one image edge.

28. The data processing device according to claim 27, wherein the at least one processor eliminates a redundant edge.

29. The data processing device according to claim 27, wherein the at least one processor restores a broken edge.

* * * * *